United States Patent Office 2,723,975
Patented Nov. 15, 1955

2,723,975

2,4-DI-PIPERIDINO-5-BENZYLPYRIMIDINE

Aaron S. Goldberg, New York, N. Y., assignor to Nepera Chemical Co., Inc., Yonkers, N. Y., a corporation of New York No Drawing. Application April 3, 1952,
Serial No. 280,392

1 Claim. (Cl. 260—256.4)

This invention relates to the preparation of certain novel pyrimidine compounds and relates more particularly to the production of novel 2,4-di-substituted-amino-5-benzyl-pyrimidine compounds.

Compounds containing a pyrimidine nucleus are of wide pharmacological interest since compounds containing the basic pyrimidine structure are known to play an important part in physiological processes. Pyrimidine derivatives of the barbiturate group, for example, constitute an important group of sedative and hypnotic compounds. Other compounds containing the pyrimidine structure are present in the cell nucleus in the form of nucleoproteins. Although the study of the physiologically active pyrimidine compounds has occupied the attention of many investigators, the usefulness of many compounds which come within the broad class of pyrimidine compounds has by no means been fully determined since it is well known that relatively small changes in the structure of pyrimidine compounds have been found to exert widely different physiological effects.

It is, therefore, an important object of my invention to provide certain novel 2,4-di-substituted-amino-5-benzyl-pyrimidine compounds having desirable physiological activity.

Another object of my invention is the provision of certain novel physiologically active 2,4-di-substituted-amino-5-benzylpyrimidine compounds which may be prepared from available or readily synthesized intermediates.

Other objects of this invention will appear from the following detailed description.

The novel pyrimidine compounds of my invention may be represented by the following formula:

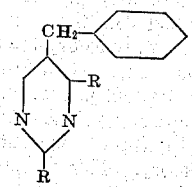

wherein R is a substituted amino group. Thus, for example, R may be an alkyl-amino group having from 1 to 6 carbon atoms, an aryl-substituted amino group, a hydroxy-alkyl-substituted amino group wherein the alkyl group may contain from 1 to 4 carbon atoms, the residue of a heterocyclic group which is linked by nitrogen to the pyrimidine nucleus, and an aralkyl-substituted amino group. Thus R may be, for example, a methylamino group, a dimethylamino group, a hydroxyethylamino group, an anilino group, a piperidino group, a benzyl amino group, a furfurylamino group, a β-phenylisopropylamino group, etc. Certain of these compounds have been found to have a respiratory analeptic effect on laboratory animals.

The novel compounds of my invention may be obtained by condensing ethyl hydrocinnamate

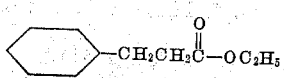

with ethyl formate so as to obtain the intermediate compound α-formyl ethyl hydrocinnamate

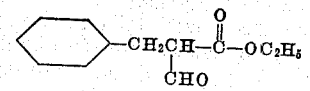

The above compound may then be reacted with urea, for example, in alcoholic solution and in the presence of some hydrogen chloride to yield (α-benzyl-β-ureido)-ethyl acrylate:

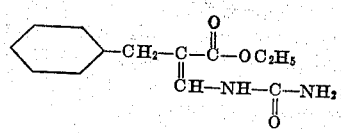

Upon heating the above compound in the presence of a base, such as, for example, 10% aqueous sodium hydroxide, ring closure takes place with the formation of 5-benzyl uracil. Treatment of the 5-benzyl uracil with phosphorus oxychloride yields 2,4-dichloro-5-benzylpyrimidine which, by reaction with an excess of a suitable amine, preferably an 8 to 10 times molecular excess, can be converted to the novel compounds of my invention.

In order to further illustrate my invention but without being limited thereto, the following examples are given:

*Example 1*

67 parts by weight of sodium metal and 2 parts by weight of potassium metal are placed in a reaction vessel, sufficient toluene added to cover the metal and the mixture then heated with some agitation until the sodium and potassium are melted and the molten alloy broken down into small particles. The toluene is then decanted from the molten alloy and a mixture of 375 parts by weight of ethyl hydrocinnamate, 350 parts by weight of ethyl formate and 850 parts by weight of diethyl ether are gradually added to the sodium-potassium alloy. The addition is made under reflux and at a rate sufficient to maintain the exothermic reaction mixture at a lively boil. Hydrogen is given off as a reaction product. When the addition of the ethyl formate and diethyl ether is completed and the evolution of hydrogen ceases, the reaction mixture is allowed to reflux for a period of about 1 hour. The mixture is poured on to ice, the aqueous phase separated from the ether phase, and, after washing the ether phase once with dilute aqueous sodium hydroxide, the ether phase is discarded. The aqueous sodium hydroxide phases are combined, acidified with cold hydrochloric acid and the combined acidified aqueous phase then extracted with ether. The ether is separated and the ether evaporated under reduced pressure. The formyl ester is then distilled under a pressure of 1 mm. or less. A yield of 70% of theory of ethyl α-formyl hydrocinnamate is obtained as the product.

100 parts by weight of the ethyl α-formyl hydrocinnamate thus obtained are added to a mixture containing 35 parts by weight of urea, 235 parts by weight of absolute ethyl alcohol and 6 parts by weight of ethyl alcohol which has been saturated with hydrogen chloride at 20° C. The mixture thus formed is heated at 50–60° C. for about one hour and, after being allowed to stand at a temperature of about 40° C. for about 12–20 hours, followed by standing for about 16 hours at a temperature of 0–5° C., ethyl α-benzyl β-ureido acrylate crystallizes out. The crystals are filtered, washed with 50% aqueous ethyl alcohol and then with a small amount of ether.

32 parts by weight of the ethyl α-benzyl β-ureido acrylate are placed in a suitable reaction vessel and 54 parts by weight of a 2 N aqueous solution of sodium hydroxide are added. Heating is continued at the boiling point for about 30 minutes. The mixture is acidified with warmed 2N aqueous hydrochloric acid. A precipitate of 5-benzyl-uracil is obtained on acidification. The mixture is cooled, the 5-benzyluracil is filtered off and the latter then washed with water and dried. The 5-benzyluracil may then be converted to 2,4-dichloro-5-benzylpyrimidine by reacting the former with an excess phosphorus oxychloride under reflux for about 3 hours. To separate the 2,4-dichloro-5-benzylpyrimidine, the reaction mixture is reduced in volume by heating under reduced pressure until it becomes slightly syrupy. The syrupy liquid is then diluted with some chloroform, ice is added and, after agitation, the aqueous and chloroform phases are separated. The chloroform layer is washed several times with ice water and dried with sodium sulfate. After boiling off the chloroform, 2,4-dichloro-5-benzylpyrimidine is obtained and may be further purified by distillation under vacuum. This compound has a boiling point of 160° C. under 1 mm. pressure.

*Example II*

3 parts by weight of 2,4-dichloro-5-benzylpyrimidine are heated for 12 hours under autogenous pressure at a temperature of 100° C. with 18 parts by weight of an ethanol solution saturated with methylamine at 3° C. The reaction product obtained is added to a mixture of 15 parts by weight of water and 30 parts by weight of ether, agitated, and then separated. The ether phase is washed twice more with 15 parts by weight of water and dried over anhydrous sodium sulfate. The ether is concentrated to small bulk and some petroleum ether added. The solution is then left at a temperature of 0–5° C. for 16 hours and the crystals of 2,4-bis-methylamino-5-benzylpyrimidine which form are then filtered off. A yield of 78% of theory is obtained. This novel compound has a melting point of 124° C.

*Example III*

To 4 parts by weight of 2,4-dichloro-5-benzylpyrimidine are gradually added, with cooling, 20 parts by weight of a 33% by weight solution of dimethylamine in benzene. The reaction mixture is then heated for 10 hours at 100° C. and under autogenous pressure. After agitation with a mixture of 40 parts by weight of water and 20 parts by weight of ethyl ether, the ether layer is separated and the ether distilled off. Without attempting to crystallize the product, it is then subjected to distillation under a pressure of about 1 mm. of mercury and the distillate crystallizes as it cools. A yield of 96% of theory of 2,4-bis-(dimethylamino)-5-benzylpyrimidine is obtained melting at 64° C.

*Example IV*

A mixture of 3 parts by weight of 2,4-dichloro-5-benzylpyrimidine, 395 parts by weight of absolute ethyl alcohol and 6.15 parts by weight of ethanolamine are heated in an autoclave under autogenous pressure at 100° C. for 16 hours. 30 parts by weight of diethyl ether are added to the reaction mixture obtained. The ether layer is extracted three times, about 20 parts by weight of water being employed for each extraction. The ether phase is finally separated and dried over anhydrous sodium sulfate. The major part of the ether is distilled off and the ether solution cooled to 0–5° C. and held at that temperature for 16 hours to effect crystallization. The crystals obtained are filtered and then washed with a 50/50 mixture, by weight, of diethyl ether/petroleum ether. A yield of 80% of theory of 2,4-di-β-hydroxyethylamino-5-benzylpyrimidine is obtained, melting at 109° C.

*Example V*

5 parts by weight of 2,4-dichloro-5-benzylpyrimidine are mixed with about 8 parts by weight of benzene and 11.2 parts by weight of piperidine and the whole heated in an autoclave at about 100° C. for about 8 hours. The amount of piperidine present should be sufficient to neutralize all of the hydrogen chloride formed during the reaction and to provide an excess of 50 mol percent. After heating is completed, 50 parts by weight of diethyl ether are added, the mixture agitated and then washed with successive portions of water until the water layer obtained is only slightly alkaline. The ether layer is separated, dried over anhydrous sodium sulfate and then concentrated by evaporating off the ether. Petroleum ether is then added just to the point of crystallization. The product is crystallized out by cooling at 0–5° C. for 16 hours and the crystals then filtered off. A yield of 70% of theory of 2,4-di-piperidino-5-benzylpyrimidine is obtained, melting at 78° C.

*Example VI*

To 3 parts by weight of 2,4-dichloro-5-benzylpyrimidine are added 8.8 parts by weight of anhydrous benzene and then 8.65 parts by weight of cyclohexylamine are added with agitation. An exothermic reaction takes place. When the initial exothermic reaction is complete, the reaction mixture is then heated in an autoclave at 100° C. for 20 hours. The entire reaction mixture is then dissolved in diethyl ether and the ethereal mixture extracted several times with water until the water extract obtained is just slightly alkaline. The ether layer is then dried over anhydrous sodium sulfate and concentrated by evaporating off the ether. If necessary, some petroleum ether may be added to initiate the crystallization of 2,4-di-cyclohexylamino-5-benzylpyrimidine. The crystals formed are then filtered off. A yield of 89% of theory of 2,4-dicyclohexylamino-5-benzylpyrimidine is obtained. This novel compound has a melting point of 149° C.

*Example VII*

3 parts by weight of 2,4-dichloro-5-benzylpyrimidine are mixed with 3 parts by weight of aniline (2.57 mols) and the mixture heated for 8 hours at 70–80° C. A crystalline mass is obtained which is then ground up or pulverized in benzene. The crystals are then filtered off, washed with benzene and finally with diethyl ether. A yield of 85% of theory of 2,4-dianilino-5-benzylpyrimidine is obtained, the compound having a melting point of 207° C.

*Example VIII*

A mixture of 5 parts by weight of 2,4-dichloro-5-benzylpyrimidine, 4.2 parts by weight of benzene and 11.8 parts by weight of benzylamine are heated in an autoclave at 100° C. for 14 hours. The mixture is then dissolved in diethyl ether, the ethereal solution washed with water and the ether layer then separated and dried over anhydrous sodium sulfate. Contact with the anhydrous sodium sulfate should be sufficient only to dry the ethereal layer and extended contact should be avoided to prevent premature crystallization. The product is then recovered from the ether layer by evaporating off the ether. The 2,4-dibenzylamino-5-benzylpyrimidine is obtained in an amount equal to 85% of theory. This novel compound has a melting point of 97° C.

It is to be understood that the foregoing detailed description is given merely by way of illustration and that many variations may be made therein without departing from the spirit of my invention.

Having described my invention,

What I claim is:

2,4-di-piperidino-5-benzylpyrimidine.

References Cited in the file of this patent

UNITED STATES PATENTS 2,579,259    Hitchings et al.    Dec. 18, 1951

OTHER REFERENCES

Weislogle: "Survey of Anti-Malarial Drugs" (Edwards), vol. II, part II, p. 1406 (1946).

Falco et al.: Brit. J. Pharmacol., vol. 6, pp. 187–94 (1951).

Jacob Experientia 7, 352–353 (1951).

Chem. Abst., 46, 13642 (Index Col. 2) (1952).

Falso et al.: J. Am. Chem. Soc. 73, 3761 (1951).